No. 750,061.

PATENTED JAN. 19, 1904.

P. PINCH.
FRUIT PICKER.
APPLICATION FILED MAY 16, 1903.

NO MODEL.

2 SHEETS—SHEET 1.

Witnesses
E. D. Kesler
James L. Norris Jr.

Inventor
Pearse Pinch
By James L. Norris
Atty.

No. 750,061. PATENTED JAN. 19, 1904.
P. PINCH.
FRUIT PICKER.
APPLICATION FILED MAY 16, 1903.
NO MODEL. 2 SHEETS—SHEET 2.
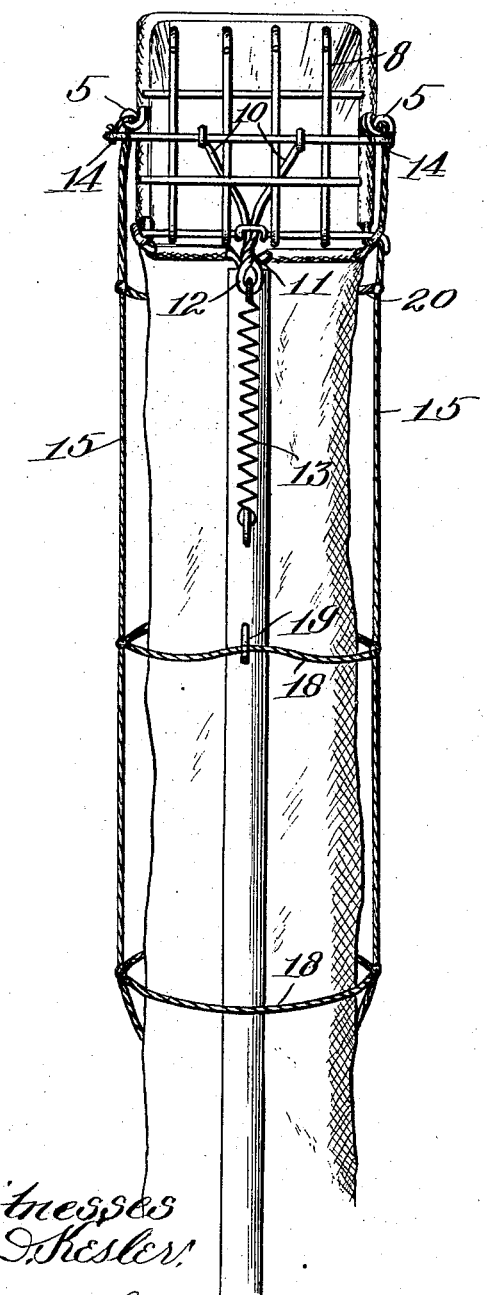
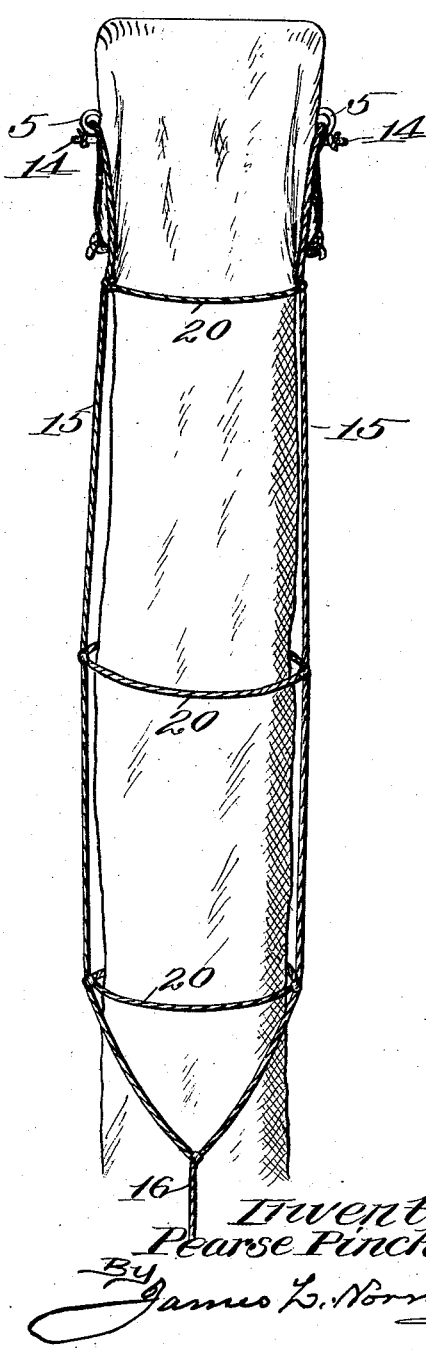

No. 750,061.

Patented January 19, 1904.

UNITED STATES PATENT OFFICE.

PEARSE PINCH, OF CHICAGO, ILLINOIS.

FRUIT-PICKER.

SPECIFICATION forming part of Letters Patent No. 750,061, dated January 19, 1904.

Application filed May 16, 1903. Serial No. 157,416. (No model.)

*To all whom it may concern:*

Be it known that I, PEARSE PINCH, a citizen of the United States, residing at Chicago, in the county of Cook and State of Illinois, have invented new and useful Improvements in Fruit-Pickers, of which the following is a specification.

This invention relates to fruit-pickers; and the object of the invention is to provide an effective device of this character having means for positively directing the fruit into a fruit-receptacle, means for preventing entrance of the picking member too far into the mouth of said receptacle, and means for controlling the descent of the fruit into said receptacle in order to prevent injury to the same.

The improved fruit-picker includes, in connection with a staff, a receptacle, a frame surrounding the mouth of the receptacle and connected with said staff, a swinging picking member having lateral projections to engage said frame on the working movement of said picking member to thereby prevent the entrance of the latter too far into the mouth of the receptacle, and means for operating said picking member. The picking member is so constructed that it properly directs the fruit into the receptacle and wholly frees the same from twigs and leaves, so that the latter are not carried into the receptacle with the fruit. This guiding of the fruit into the receptacle I secure by downwardly or inwardly curving the fingers of the picking member. In order to control the proper descent of the fruit along the receptacle, I provide means for compressing the same upon its opposite sides at different points in its length, whereby the rapid fall of the fruit is so checked that it cannot be injured. The receptacle may be of any suitable character, but consists, preferably, of a bag. I have shown and will hereinafter describe two different ways of controlling the descent of the fruit.

The invention is clearly illustrated in the accompanying drawings, forming a part of this specification, and in which—

Figure 1:
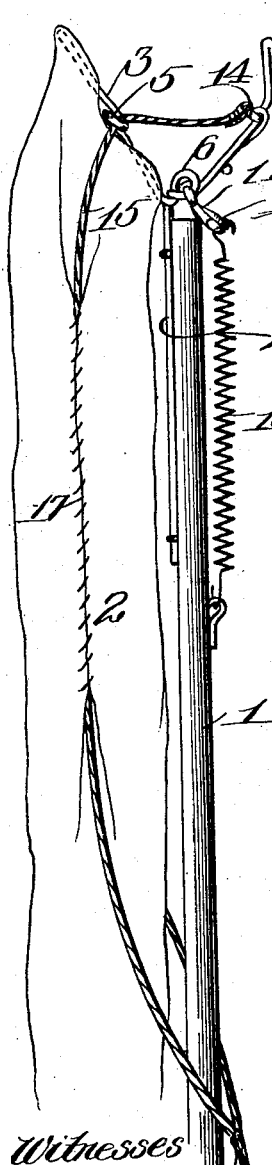
Figure 2:
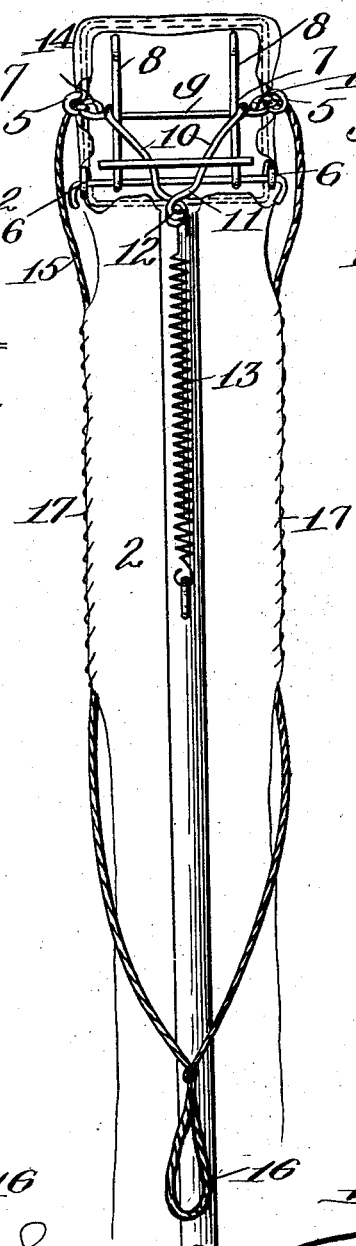
Figure 3:
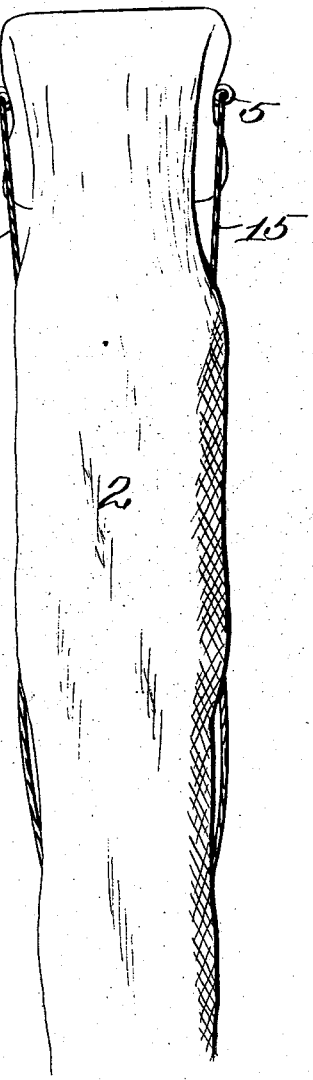

Figure 1 is a side elevation of a fruit-picker including my invention. Figs. 2 and 3 are respectively rear and front elevations of the same. Figs. 4 and 5 are views corresponding, respectively, with Figs. 2 and 3 and showing a modified manner of checking the descent of the fruit.

Like characters refer to like parts in the several figures.

The improved fruit-picker includes in its organization a staff or pole, which may be of any suitable character. The one represented is denoted by 1 and is usually made of wood and of any suitable length.

The fruit-receptacle is denoted by 2, and it is represented as consisting of a bag, preferably of textile material, extending longitudinally of the staff and fastened in some convenient way at its lower end to said staff in order to prevent swaying thereof. The upper end or mouth of the receptacle 2 is surrounded by a frame 3, which may be made of wire or other suitable material, and which is represented as rectangular in form, the parts being suitably united. For example, the upper end of the bag may be folded over the frame 3 and stitched in place. The frame 3, which is usually made of one piece, has its inner member divided and furnished with depending extensions 4, which constitute a tine, and which may be secured to the staff by staples or equivalent fastening means, as shown in Figs. 1, 2, and 3, or seated in a bore in the upper portion of said staff, as illustrated in Figs. 4 and 5. The side portions of the frame are bent upon themselves substantially centrally thereof to form the eyes 5, which, it will be seen, extend outwardly and the function of which will hereinafter appear. Besides the side eyes 5 the frame is provided with substantially similar eyes 6 at the corners thereof and which are disposed at approximately right angles to the frame.

The picking member is denoted by 7 and is preferably made of wire, it being illustrated as consisting of a skeleton or open frame including the picking-fingers 8 and the cross-bars 9, the ends of the lowermost cross-bar extending through the corner eyes of the frame 3, by reason of which it will be understood that the said picking member is mounted for swinging movement. The outer ends of the lowermost cross-bar are bent upon themselves outside of the eyes 6 to secure the picking member in place. The picking-fingers 8 are inwardly and downwardly curved, so that the same are adapted to partially surround the fruit, by reason of which when the picking member is closed or pulled toward the mouth of the receptacle 2 such fruit will be guided into said mouth, and the said picking-fingers are arranged to enter said mouth for a short distance, so that the fruit is caused positively to enter the receptacle, and as the picking member is of open-work the fruit can be readily separated from the twigs or leaves. To prevent the entrance of the picking member too far into the receptacle 2, one of the cross-bars 9 is made somewhat longer than the others, the opposite ends of said elongated cross-bar constituting lateral projections of the picking member and being arranged to engage the side bars of the frame 3 on the working motion of the picking member in order that the desired object may be secured.

A substantially V-shaped arm is shown at 10, its branches extending under one cross-bar and being bent around an adjoining cross-bar 9, so that the arm is thereby rigidly secured in place. At or near the place where the branches of said arm 10 converge it is provided with a lateral extension 11, terminating in an eye 12, to which the upper end of the coiled pull-spring 13 is connected, the lower end of said spring, which extends longitudinally of the staff 1, being united in some suitable manner to the latter. This spring maintains the picking member 7 normally open and also opens the same when it is released by the operator after the fruit is picked.

The elongated cross-bar 9, to which reference has been made, terminates at its extremities in eyes 14, to which the cords 15 or their equivalents are connected, said cords depending from the picking member and passing through the eyes 5 and being joined below the lower end of the bag in such manner as to provide a loop 16, through which the finger of the operator can be passed in order to pull down the cords 15. When said cords are pulled down, the picking member 7 is of course moved toward and slightly into the mouth of the receptacle or bag 2 in order to detach the fruit in the manner hereinbefore set forth. As the picking member moves in the manner indicated the spring 13 is stretched, whereby when the cords are released the spring serves to return the picking member to its initial position.

In order to check the descent of the fruit in the receptacle or bag 2, which bag is usually made of some textile material, I provide means for compressing the opposite sides of the same as the picking-member-actuating cords 15 are pulled downward, and, referring to Figs. 1 to 3, inclusive, the opposite sides of the bar are furnished with loops 17, arranged in cooperating pairs and through which said cords 15 are adapted to pass. The loops may be made by stitching the material of the bag around the cords. When said cords are pulled downward during the picking operation, they serve to constrict the bag at successive points in its height in order that the fruit cannot fall too rapidly, by virtue of which such fruit cannot be injured during the picking operation.

Referring to Figs. 4 and 5, the picker there shown is exactly like the one hereinbefore described, except as to the means for constricting the bag at successive points in its height and the manner of mounting the bag-frame 3, which latter has hereinbefore been mentioned. Referring to said Figs. 4 and 5, the downwardly-diverging pull-cords 15, which extend along opposite sides of the bag, are connected at superposed points by the cross-cords 18, which extend around the front of the staff and are connected therewith in some suitable manner—for example, by staples 19. From this it will be evident that as the cords 15 are drawn downward they will be moved toward each other by the intervention of the cross-cords 18, so as to constrict the bag in order to secure the result hereinbefore set forth. Cross-cords, as 20, extend across the rear of the bag and are united to the pull-cords 15 and act to prevent undue rearward movement of the bag.

The invention may be modified within the scope of the following claims.

Having thus described the invention, what I claim is—

1. In a fruit-picker, the combination of a staff, a receptacle, a substantially rectangular frame surrounding the mouth of the receptacle and connected with said staff, the sides of the frame having outwardly-extending eyes and the corners thereof having eyes disposed at an angle to said frame, a picking member provided with a cross-bar arranged to extend through the eyes at the corner of the frame and its extremities bent upon themselves, actuating-cords connected with the picking member depending therefrom and extending through the side eyes of said frame, an arm connected with the picking member, and a coiled spring connected with said arm and staff respectively for maintaining the picking member normally in its ineffective position.

2. In a fruit-picker, the combination of a staff, a flexible fruit-receptacle connected with the staff, stitched along its opposite sides to present loops, a picking member cooperative with the receptacle, and pull-cords connected with the opposite sides of the picking member, depending therefrom and passing through said loops.

3. In a fruit-picker, the combination of a staff, a fruit-receptacle, a frame surrounding the mouth of the fruit-receptacle and connected with said staff, an open-work swinging picking member having lateral projections to engage the said frame on the working movement of the said picking member, a substantially V-shaped arm connected with the picking member and terminating at its outer end in a lateral offset, a coiled spring connected with the offset and also with the staff, and cords united to the picking member, depending therefrom and joined together at a point below said picking member, the cords serving when pulled, to move the picking member toward the mouth of said receptacle.

In testimony whereof I have hereunto set my hand in presence of two subscribing witnesses.

PEARSE PINCH.

Witnesses:
   E. C. DATIN,
   W. KNIGHT.